US005639064A

United States Patent [19]
deCler et al.

[11] Patent Number: 5,639,064

[45] Date of Patent: Jun. 17, 1997

[54] DISPENSING VALVE

[75] Inventors: C. Peter deCler, St. Paul; David W. Meyer, Jordan, both of Minn.

[73] Assignee: Colder Products Company, St. Paul, Minn.

[21] Appl. No.: 317,128

[22] Filed: Oct. 3, 1994

Related U.S. Application Data

[63] Continuation-in-part of Ser. No. 932,320, Aug. 9, 1992, Pat. No. 5,353,836.

[51] Int. Cl.[6] .......... F16K 21/00

[52] U.S. Cl. .......... 251/149.5

[58] Field of Search .......... 137/614.05, 614.03, 137/614.06; 251/149.6, 149.1, 149.9, 149.5

[56] References Cited

U.S. PATENT DOCUMENTS

| | | | |
|---|---|---|---|
| 3,276,474 | 10/1966 | Gill . | |
| 3,592,439 | 7/1971 | Ritchie, Jr. | 251/149.6 |
| 3,625,251 | 12/1971 | Nelson . | |
| 3,706,318 | 12/1972 | Baniadam et al. . | |
| 4,169,548 | 10/1979 | Bond . | |
| 4,331,266 | 5/1982 | Bond . | |
| 4,362,255 | 12/1982 | Bond . | |
| 4,421,146 | 12/1983 | Bond et al. . | |
| 4,436,125 | 3/1984 | Blenkush . | |
| 4,445,551 | 5/1984 | Bond et al. . | |
| 4,500,118 | 2/1985 | Blenkush . | |
| 4,541,457 | 9/1985 | Blenkush . | |
| 4,564,132 | 1/1986 | Lloyd-Davies . | |
| 4,630,847 | 12/1986 | Blenkush . | |
| 4,703,957 | 11/1987 | Blenkush . | |
| 4,787,859 | 11/1988 | Heller . | |

(List continued on next page.)

FOREIGN PATENT DOCUMENTS 0 479 752 A2 4/1992 European Pat. Off. .

OTHER PUBLICATIONS

"Softube™ fittings", Colder Products Company product brochure, Form ST-1, Rev 2-691, (4 pages).
"Softube® fittings", Colder Products Company product brochure, Form ST-1, 993, (4 pages).
"General Program", product brochure by Staubli SA, 03.90, (16 pages).
"CPC Quick Couplings for Plastic Tubing", Colder Products Company product brochure, Form CP-1, Rev 2 990, (36 pages).
"Quick Couplings for PlasticTubing", Colder Products Company product borchure, Form 05-90, (2 pages).
"High Temperature quick Disconnect Couplings", Colder Products Company product brochure, Form CP-11, (1 page).
"APC™ All Plastic Quick Disconnect Couplings", Colder Products Company product brochure, Form CP-12, (1 page).
"Free Flow™ Couplings", Colder Products Company product brochure, Form MPC-2 1091, (2 pages).
"Standard Quick Disconnects, Special Application Quick Disconnects, Subminiature Couplings", Colder Products Company product brochure, (1 page).
"Medical Plastic Coupling", Colder Products Company product brochure, Form MPC-1 791, (4 pages).

*Primary Examiner*—Kevin Lee
*Attorney, Agent, or Firm*—Merchant, Gould, Smith, Edell, Welter & Schmidt, P.A.

[57] ABSTRACT

A valve assembly includes a receptor valve assembly having a normally closed fluid passage, and an insert assembly having an open fluid passage. The insert assembly and the receptor valve assembly each include a valve activation structure engageable with one another for opening the fluid passage of the receptor valve assembly upon engagement of the valve activation structures and rotation of the insert assembly relative to the receptor valve assembly wherein their fluid passages are interconnected. The insert assembly and the receptor valve assembly are configured to provide substantially no fluid passage therebetween when closed.

8 Claims, 15 Drawing Sheets

U.S. PATENT DOCUMENTS

| | | | |
|---|---|---|---|
| 4,848,600 | 7/1989 | Dark . | |
| 4,903,995 | 2/1990 | Blenkush et al. . | |
| 4,934,655 | 6/1990 | Blenkush et al. . | |
| 4,946,200 | 8/1990 | Blenkush et al. . | |
| 4,966,780 | 10/1990 | Hargraves et al. . | |
| 5,031,662 | 7/1991 | Roethel . | |
| 5,033,777 | 7/1991 | Blenkush . | |
| 5,050,841 | 9/1991 | Jacobsson | 251/149.9 |
| 5,104,158 | 4/1992 | Meyer et al. . | |
| 5,110,013 | 5/1992 | Clark et al. . | |
| 5,178,303 | 1/1993 | Blenkush et al. . | |
| 5,255,713 | 10/1993 | Scholle et al. | 251/149.6 X |
| 5,316,041 | 5/1994 | Ramacier, Jr. et al. . | |
| 5,353,836 | 10/1994 | deCler et al. . | |

DISPENSING VALVE

This is a continuation-in-part application of the U.S. patent application Ser. No. 07/932,320, filed Aug. 19, 1992; U.S. Pat. No. 5,353,836.

FIELD OF THE INVENTION

The present invention relates to dispensing valve used in fluid dispensing system for dispensing fluid from a container containing fluid or for providing an in-line connection.

BACKGROUND OF THE INVENTION

Various types of dispensing valves or control valves, such as fluid dispensing valves, have been used in the past in connection with the fluid dispensing systems for dispensing and controlling fluid flow.

One use of dispensing valves is with collapsible containers or flexible bags for dispensing fluid from the containers. A fitment is typically provided in the opening of the container for allowing attachment of the dispensing valve to the container. Yet other uses of dispensing valves include in-line connections wherein the valve interconnects two fluid passageways.

With respect to the dispensing valve industry, a major concern is minimizing the cost to manufacture the dispensing valves. Another concern is to find a way to easily open the fluid passageway to dispense fluid or close the fluid passageway as desired and not spill any fluid. Yet another concern is to vent the container as fluid is being withdrawn.

While the above noted and other dispensing valves provided in the art have to some extent met the need in the art for dispensing fluid, it is clear that there has existed and still is an unfilled need in the art for an improved, cost effective and reliable dispensing valve. The present invention provides an improved dispensing valve.

SUMMARY OF THE INVENTION

The present invention relates to a dispensing valve having a receptor valve assembly and an insert valve assembly, both defining a fluid passage therein.

One embodiment of the present invention relates to a dispensing valve assembly comprising:

a receptor valve assembly defining a normally closed fluid passage; an insert valve assembly defining a normally closed fluid passage; and the insert and receptor valve assemblies including means for connecting the insert and receptor valve assemblies, and further including valve insert means operable upon rotation of the insert valve assembly to open the dispensing valve when the insert and receptor valve assemblies are connected.

In yet another embodiment of the present invention, the receptor valve assembly and insert valve assembly cooperate to define air passage means for venting air while allowing fluid flow.

In still another embodiment, the receptor valve assembly and the insert valve assembly include means for locking the receptor valve assembly and insert valve assembly together when the dispensing valve is opened.

Yet another embodiment includes locking means for normally preventing movement of the insert means. In one embodiment, said locking means is spring biased.

In one embodiment, a coil spring might be used to bias the locking means. The coil spring is out of the fluid flow passage in a preferred embodiment of the invention.

One embodiment of a dispensing valve in accordance with the present invention comprises:

a receptor valve assembly having a fluid passage therethrough and including a fitment body and a hollow insert disposed in the fitment body, the fitment body including a first end portion and a second end portion and defining a fluid passage therethrough, the fitment body further having an inner surface with a set of helical grooves disposed therein, the hollow insert including first and second end portions and an outer surface having a set of helical splines on an outer surface corresponding to the first set of the helical grooves of the fitment body, the hollow insert further having an inner surface defining a set of longitudinal apertures proximate the second end portion of the hollow insert, the fitment body and the hollow insert cooperating to normally close the fluid passageway, an insert valve assembly defining a fluid passageway therethrough and including a coupling locking barrel, a locking sleeve collar, an insert stem, and a hollow sleeve, the insert valve assembly being attached to the coupling locking barrel to prevent relative movement therebetween, a second set of helical splines being disposed on an outer surface of the insert stem, the hollow sleeve having an inner surface defining a second set of helical grooves corresponding to the second set of the helical splines of the insert stem, an outer surface of the hollow sleeve having a set of longitudinal projections receivable in the corresponding longitudinal apertures of the hollow insert, the hollow sleeve including apertures engageable with projections on the locking sleeve collar when the locking collar sleeve is in a first normal position so as to prevent rotation of the hollow sleeve relative to the locking collar sleeve; and cooperative means on the insert valve assembly and the receptor valve assembly for forcing the locking sleeve collar into a second position out of engagement with the hollow sleeve whereby upon rotation of the coupling locking barrel relative to the fitment body the dispensing valve is opened enabling fluid flow therethrough.

Still in one embodiment, both the insert valve assembly and the receptor valve assembly have a valve configuration for controlling a fluid flow in the dispensing valve.

In a second embodiment, only the receptor valve assembly has a valved configuration for controlling a fluid flow in the dispensing valve. The insert valve assembly does not have a valved configuration. The fluid passageway of the insert valve assembly remains open. The insert valve assembly does not shut off fluid flow in its fluid passage when the valve assembly is in the disconnected state. Accordingly, the term "insert assembly" is used in the second embodiment.

In the second embodiment, the hollow sleeve and the insert stem of the insert valve assembly of the first embodiment are molded into one piece, which is called a hollow insert stem, in the second embodiment. The locking sleeve collar and some other related parts are eliminated. Accordingly, the insert assembly has less parts thus less cost and has better flow in the coupled state and other associated advantages.

These and various other advantages and features of novelty which characterize the invention are pointed out with particularity in the figs annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing in which like reference numerals and letters generally indicate corresponding parts throughout the several views.

DETAILED DESCRIPTION OF THE PREFERRED EMBODIMENTS

Figure 1:
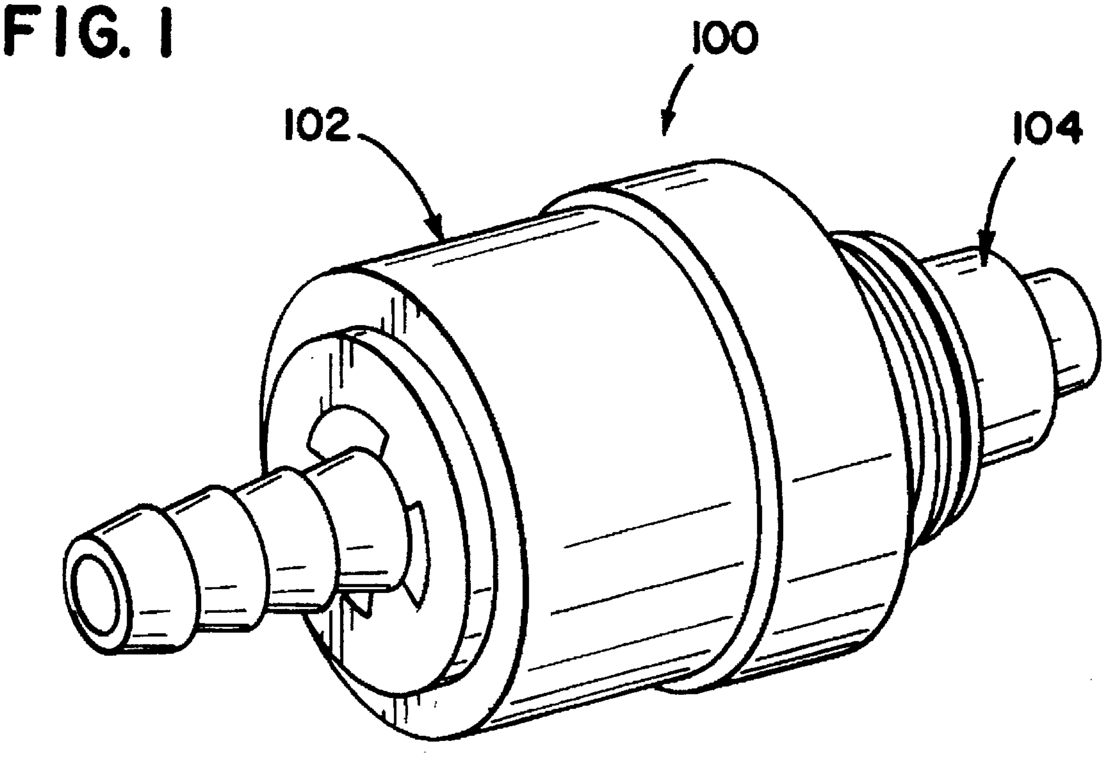
FIG. 1 is a perspective view of an embodiment of a dispensing valve in accordance with the principles of the present invention including an insert valve assembly and a receptor valve assembly.

Referring to FIG. 1, there is shown an embodiment of a dispensing valve 100 in accordance with the principles of the present invention. The dispensing valve 100 includes an insert valve assembly 102 and a receptor valve assembly 104.

Figure 1A:
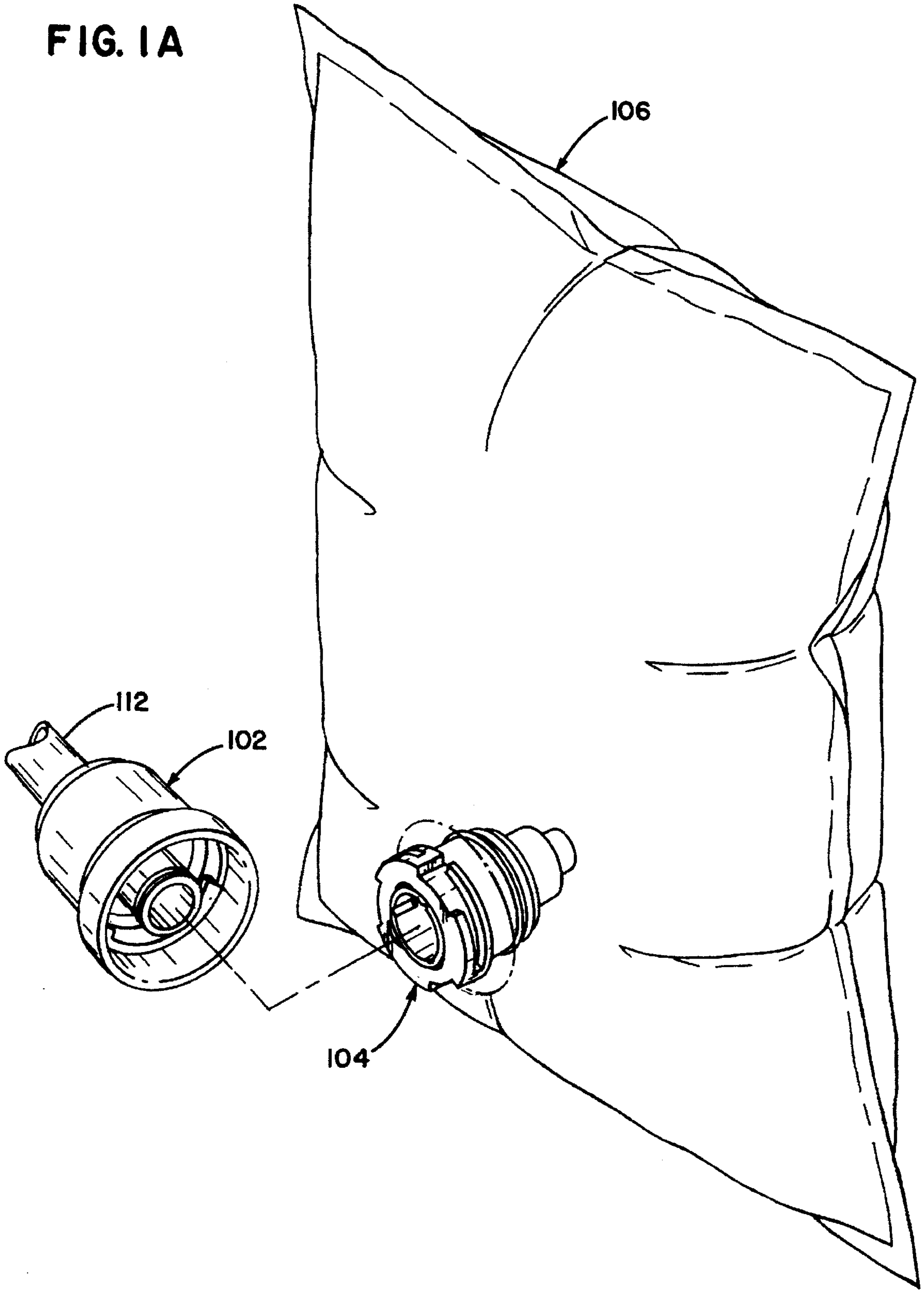
FIG. 1A is a perspective view of the dispensing valve being used with a collapsible bag, the insert valve assembly and the receptor valve assembly being uncoupled.
Figure 1B:
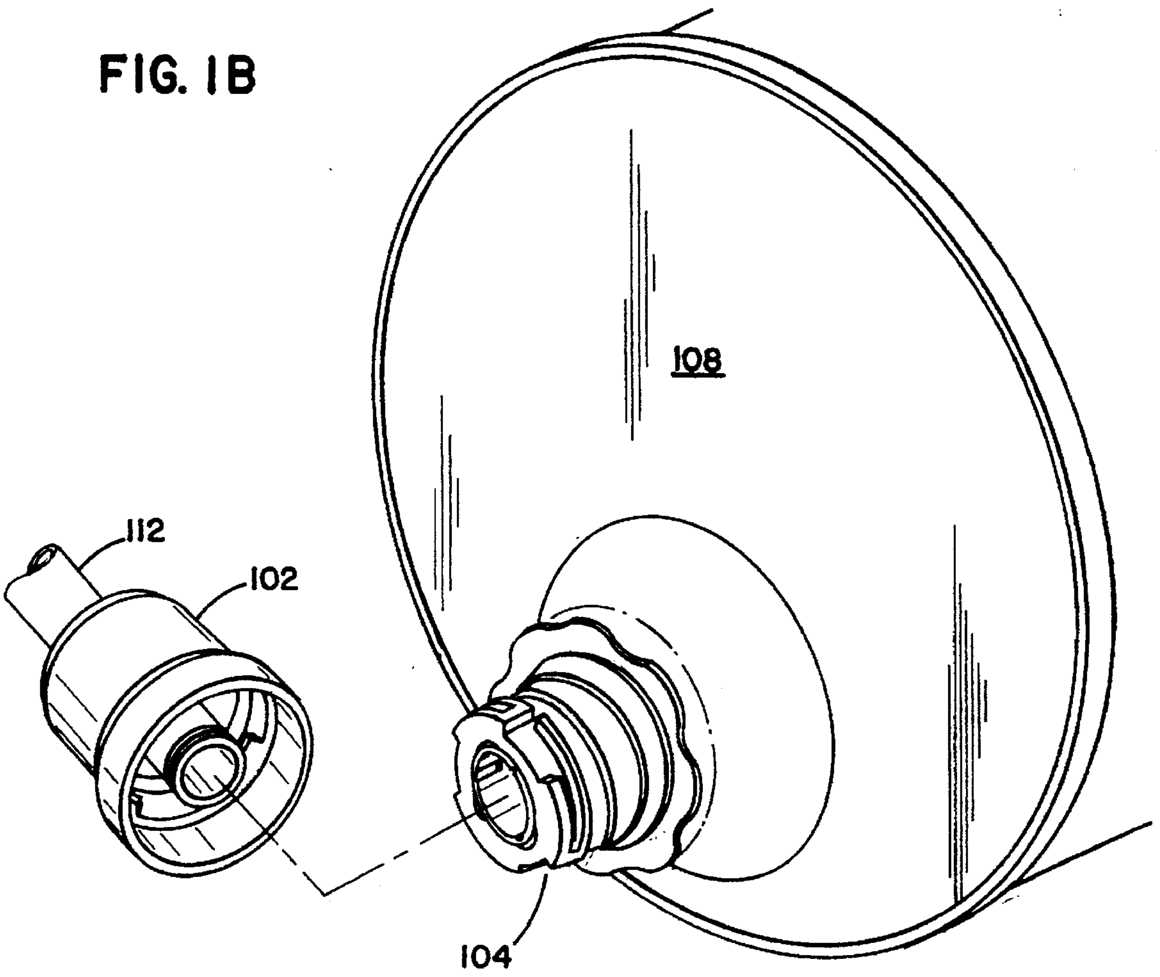
FIG. 1B is a perspective view of the dispensing valve being used with a rigid container, the insert valve assembly and the receptor valve assembly being uncoupled.
Figure 1C:
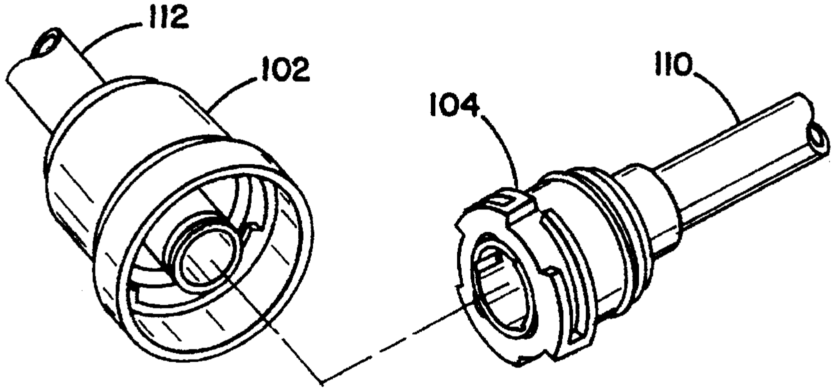
FIG. 1C is a perspective view of the dispensing valve being used as an in-line connector, the insert valve assembly and the receptor valve assembly being uncoupled.

Now referring to FIGS. 1A–1C, the dispensing valve 100 is shown being used to connect a tube 112 with a collapsible container 106, to connect a tube 112 with a rigid container 108, and as an in-line connector for connecting a tube 110 to a tube 112. In the FIGS. 1A–1C, the insert valve assembly 102 and the receptor valve assembly 104 are uncoupled. During use, the insert valve assembly 102 is engaged the receptor valve assembly 104 so as to form the dispensing valve 100 as shown in FIG. 1. These are but three uses of the present invention. It will be appreciated that other uses of the present invention might be made.

Figure 2A:
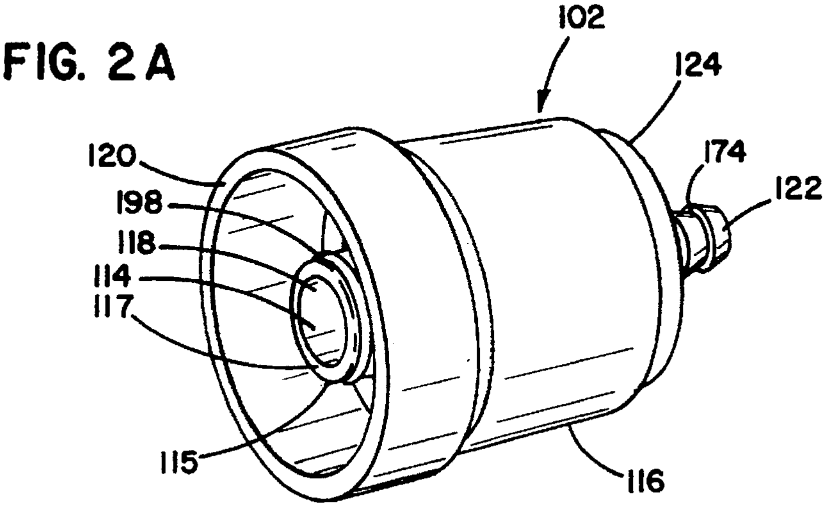
FIG. 2A is a perspective view of the insert valve assembly of the dispensing valve shown in FIG. 1.
Figure 2B:
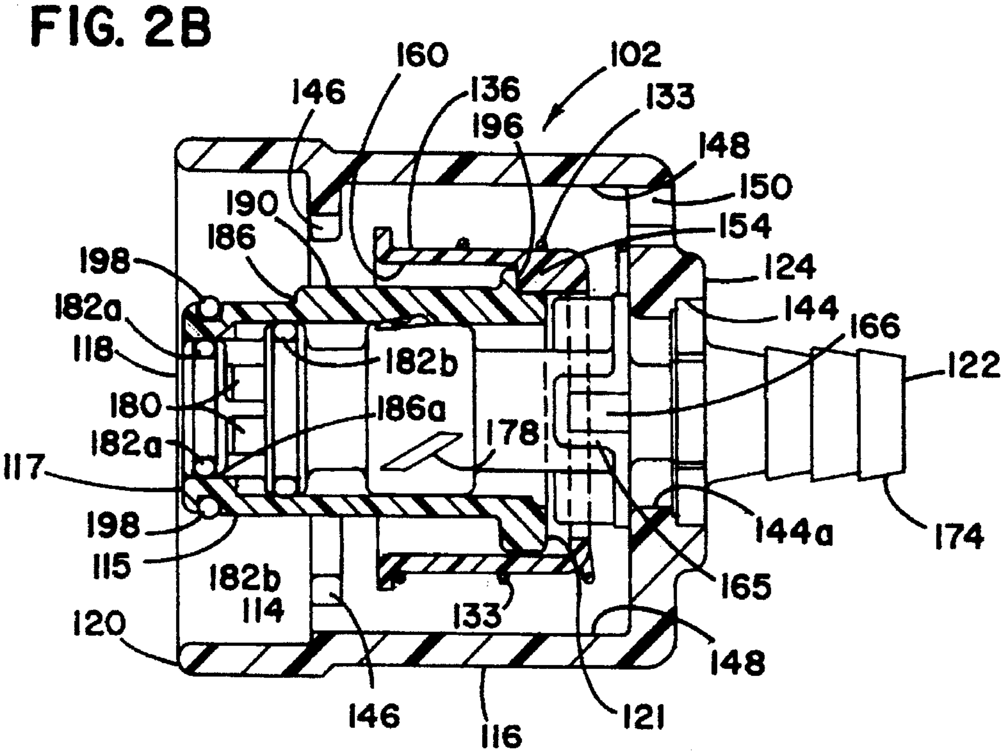
FIG. 2B is a longitudinal cross-sectional view of the insert valve assembly shown in FIG. 2A.
Figure 2C:
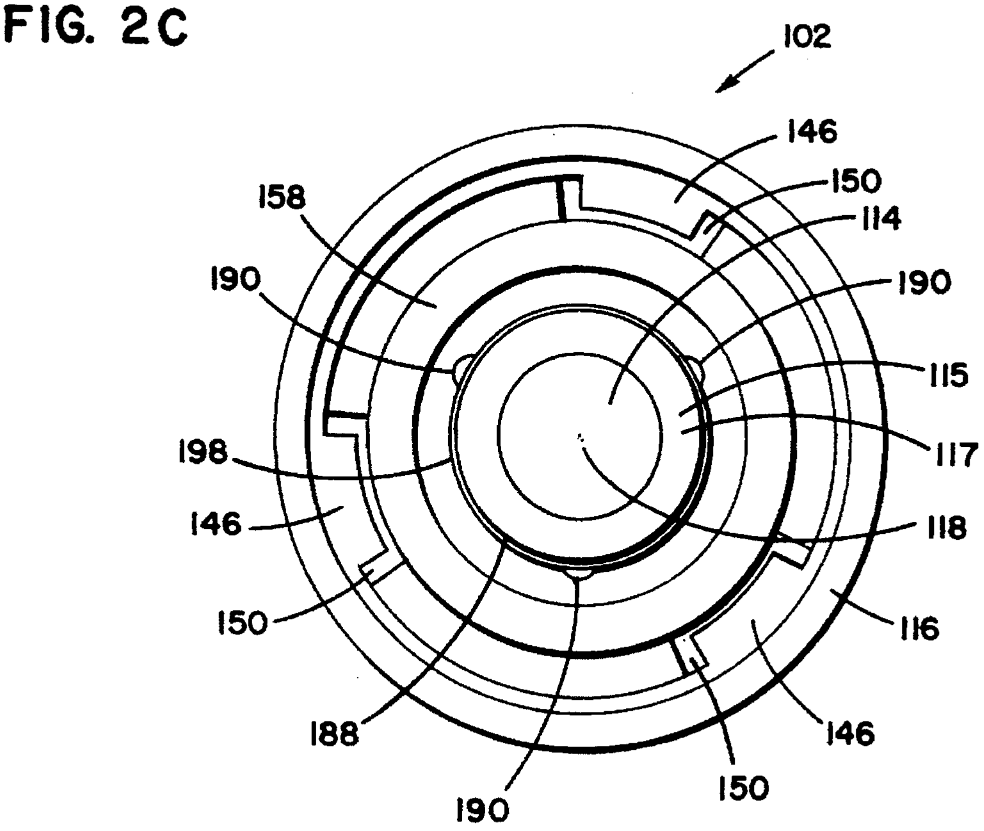
FIG. 2C is a left end view of the insert valve assembly shown in FIG. 2A.

Referring to FIGS. 2A–2C, a perspective view, a longitudinal cross-sectional view and a left end view, respectively, of the insert valve assembly 102, are shown. An insert stem 114 and a hollow sleeve 115 are substantially disposed inside of a coupling locking barrel 116 of the insert valve assembly 102. A front end 118 of the insert stem 114 and a front end 117 of the hollow sleeve 115 are disposed proximate a front end 120 of the coupling locking barrel 116. The insert stem 114, also having a back end 122, projects out through an opening in a back end 124 of the coupling locking barrel 116. The back end 122 of the insert stem 114 forms a back end of the insert valve assembly 102.

The front end 118 of the insert stem 114 is engaged with the front end 117 of the hollow sleeve 115. The hollow sleeve 115 has a back end 121 which engages with the insert stem 114 at an intermediate portion of the insert stem 114.

A locking sleeve collar 136 is engaged with the hollow sleeve 15 at the back end 121, and is engaged with the insert stem 114. A flexible member 133 is wound around the locking sleeve collar 136 so as to spring-bias the locking sleeve collar 136 into engagement with the hollow sleeve 115.

Figure 3A:
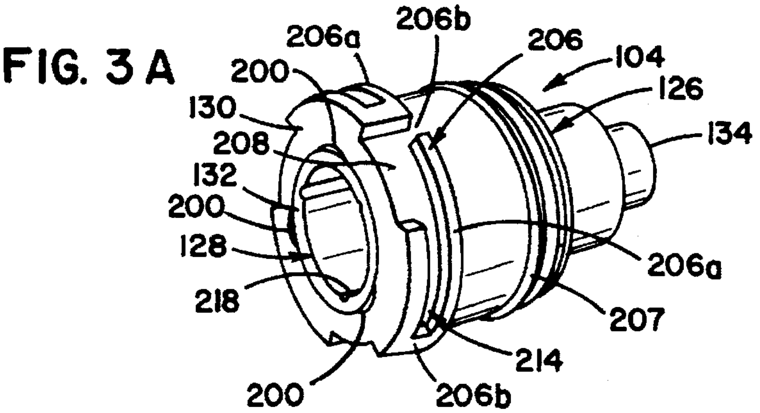
FIG. 3A is a perspective view of the receptor valve assembly of the dispensing valve shown in FIG. 1.
Figure 3B:
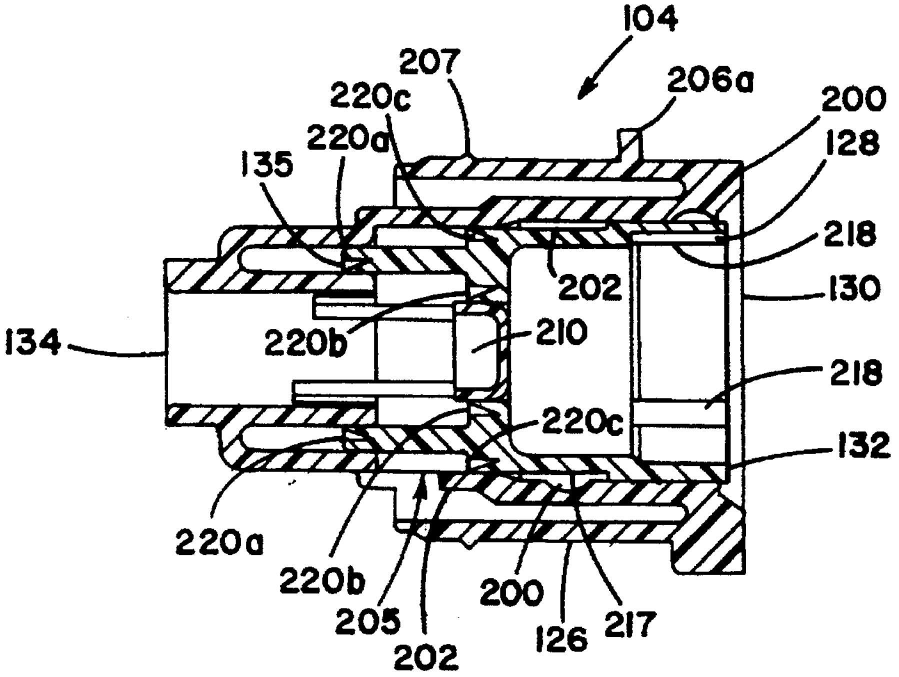
FIG. 3B is a longitudinal cross-sectional view of the receptor valve assembly shown in FIG. 3A.
Figure 3C:
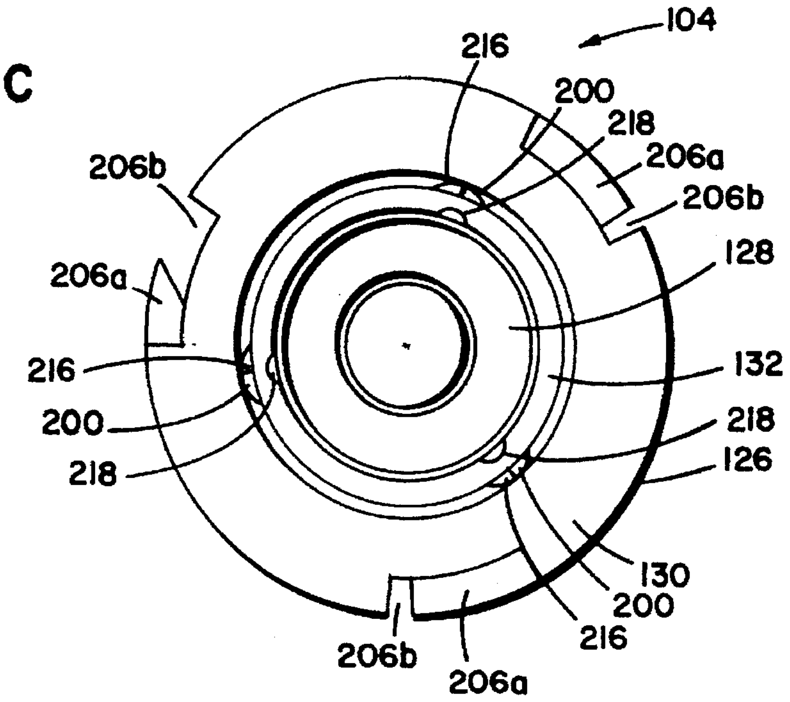
FIG. 3C is a left end view of the receptor valve assembly shown in FIG. 3A.

Referring now to FIGS. 3A–3C, a perspective view, a longitudinal cross-sectional view and a left end view, respectively, of the receptor valve assembly 104, are shown. A hollow insert 128 of the receptor valve assembly 104 is concentrically disposed in a fitment body 126. The fitment body has a back end 134 which forms a back end of the receptor valve assembly 104. The front end 130 of the fitment body 126 is attached to the front end 132 of the hollow insert 128. The hollow insert 128 has a back end 135 which is disposed proximate an intermediate portion of the fitment body 126 of the receptor valve assembly 104.

Figure 4:
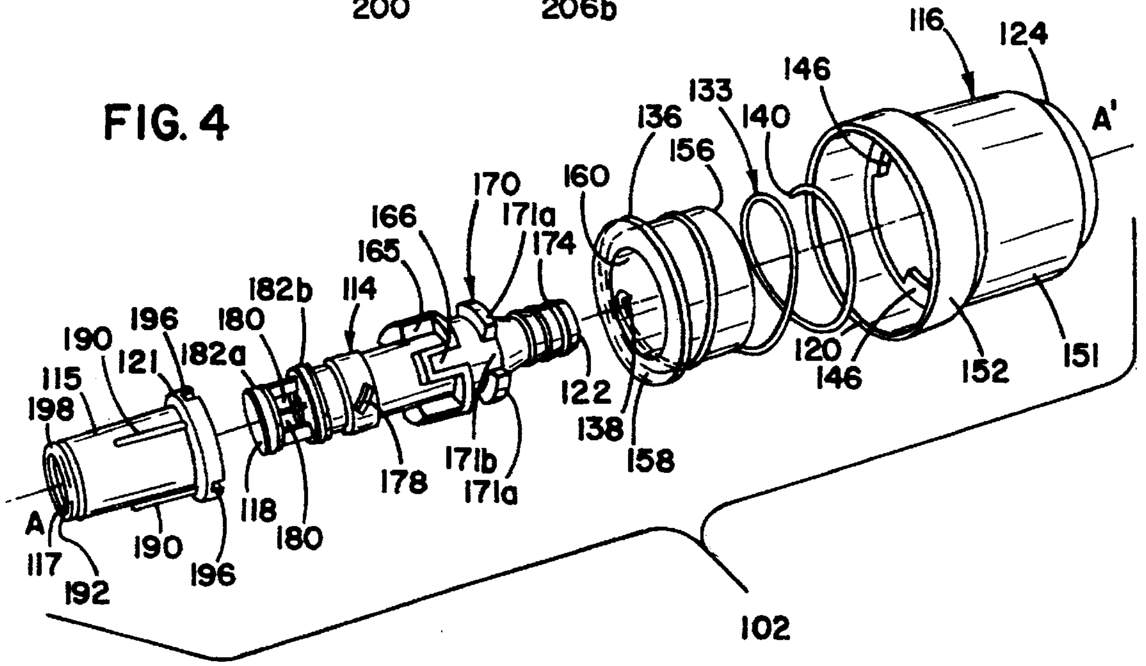
FIG. 4 is an exploded view of the insert valve assembly shown in FIG. 2A.

Referring now to FIG. 4, an exploded view of the insert valve assembly 102 of the dispensing valve 100 is shown. The coupling locking barrel 116, the flexible member 133, the locking sleeve collar 136, the insert stem 114 and the hollow sleeve 115 are disposed along a longitudinal axis A–A'. The front end 118 of the insert stem 114 is concentrically disposed within the hollow sleeve 115 by sliding the hollow sleeve 115 onto the front end 118 of the insert stem 114.

One end 138 of the flexible member 133 is inserted into an aperture which is on an outer surface 142 of the locking sleeve collar 136. The other end 140 of the flexible member 133 is a free end which engages the end 124 of the coupling locking barrel 116 when the locking sleeve collar 136 is disposed in the coupling locking barrel 116. The insert stem 114 is configured and arranged to provide an interference fit with an opening at the back end 124 of the coupling locking barrel 116 through which it projects. Accordingly, the insert stem 114 is retained in the coupling locking barrel 116 and is prevented from having any longitudinal or rotational movement relative to the coupling locking barrel 116. The detailed structures of the above individual parts of the insert valve assembly 102 are discussed below.

Figure 5:
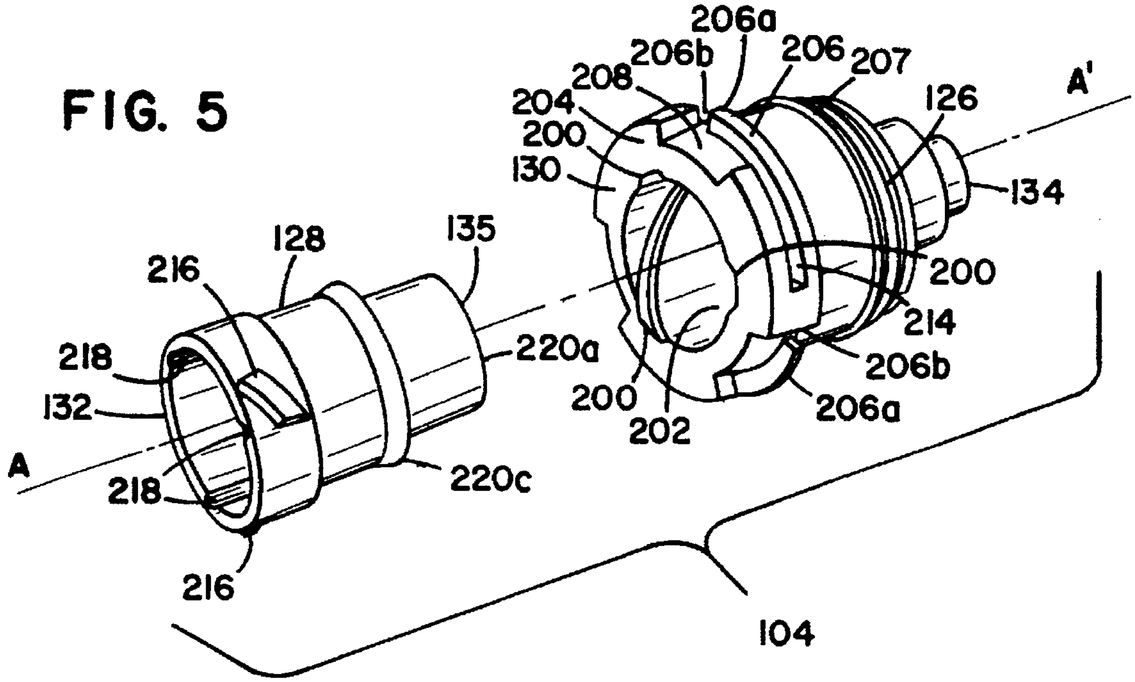
FIG. 5 is an exploded view of the receptor valve assembly shown in FIG. 3A.

Referring to FIG. 5, an exploded view of the receptor valve assembly 104 of the dispensing valve 100 is shown. The fitment body 126 and the hollow insert 128 are shown disposed along the longitudinal axis A–A'. The detailed structures of the above individual parts of the receptor valve assembly 104 are discussed below.

Figure 6A:
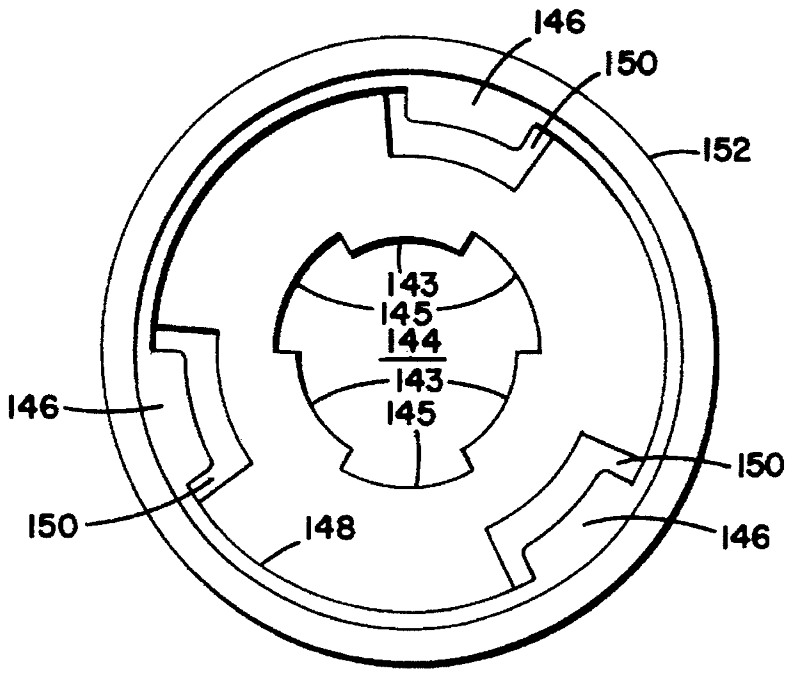
FIG. 6A is a left end view of the coupling locking barrel shown in FIG. 4.
Figure 6B:
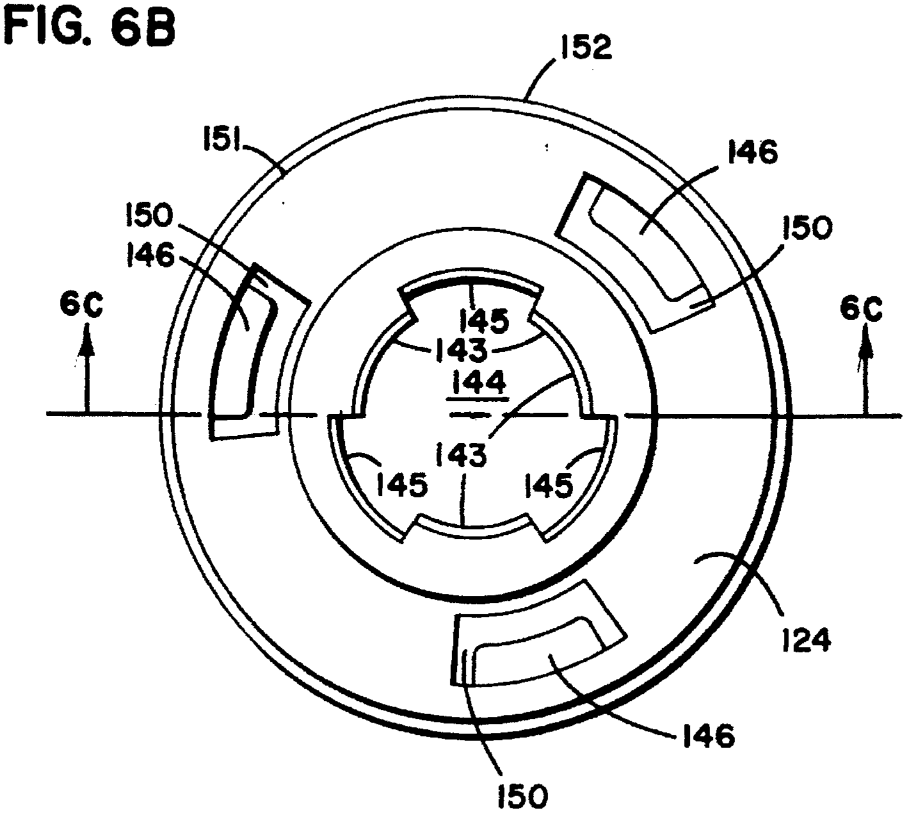
FIG. 6B is a right end view of a coupling locking barrel shown in FIG. 4.
Figure 6C:
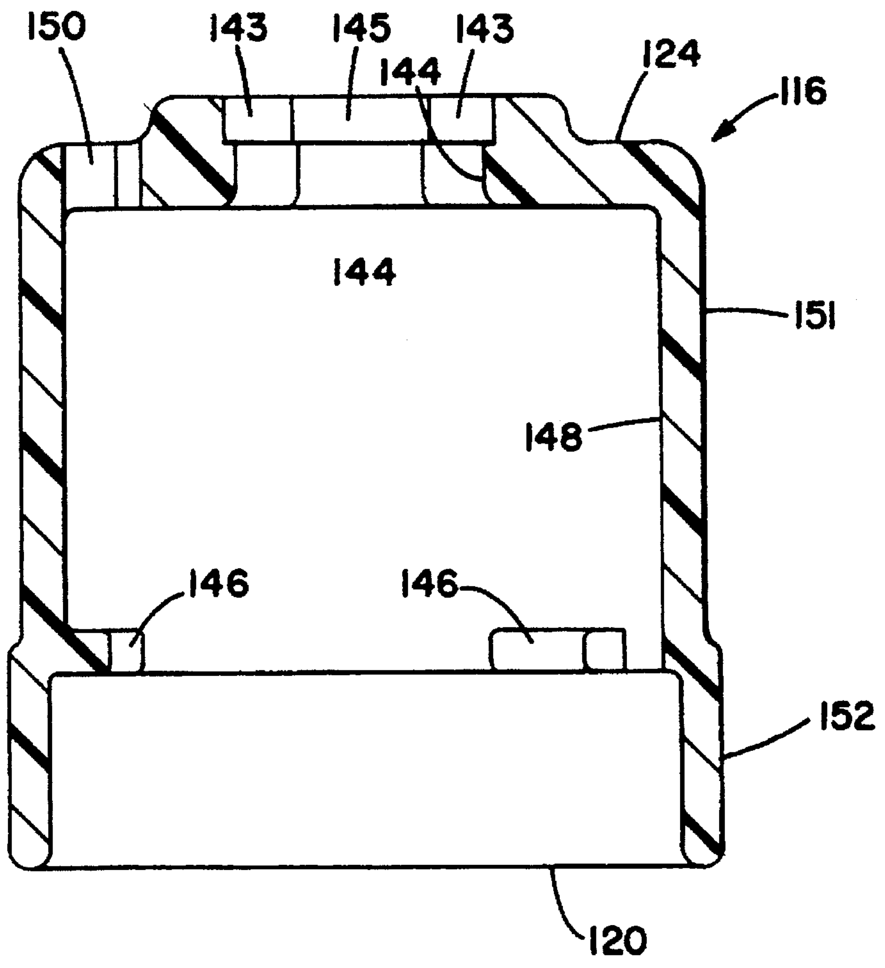
FIG. 6C is a longitudinal cross-sectional view generally along line 6C—6C in FIG. 6B.

Referring now to FIGS. 6A–6C, further details of the coupling locking barrel 116 of the insert valve assembly 102 are shown. FIG. 6A shows an end view looking from the front end 120 of the coupling locking barrel 116 in FIG. 4. An opening 144 is shown in the back end of the coupling locking barrel 166. The periphery of the opening 144 being defined by a set of projections 143 and a set of recesses 145 having curvilinear surfaces. Three radially inwardly extending coupling teeth 146 disposed on an inner surface of the coupling locking barrel 116 are shown axially aligned with three openings 150 defined in the back end 124 of the coupling locking barrel 116. The coupling teeth 146 are displaced a predetermined distance in back of the front end 120 of the coupling locking barrel 116.

FIG. 6B is shown an end view looking from the back end 124 of the coupling locking barrel 116 in FIG. 6A and FIG. 6C is a front view looking from the font end 120 of the coupling locking barrel 116 in FIG. 6A. The opening 144 is shown in the middle of the FIG. 6C defined by the projections 143 and recesses 145. A diameter of an outer surface 151 at the back end 124 of the coupling locking barrel 116 is smaller than a diameter of an outer surface 152 at the front end 120 of the coupling locking barrel 116.

Figure 7A:
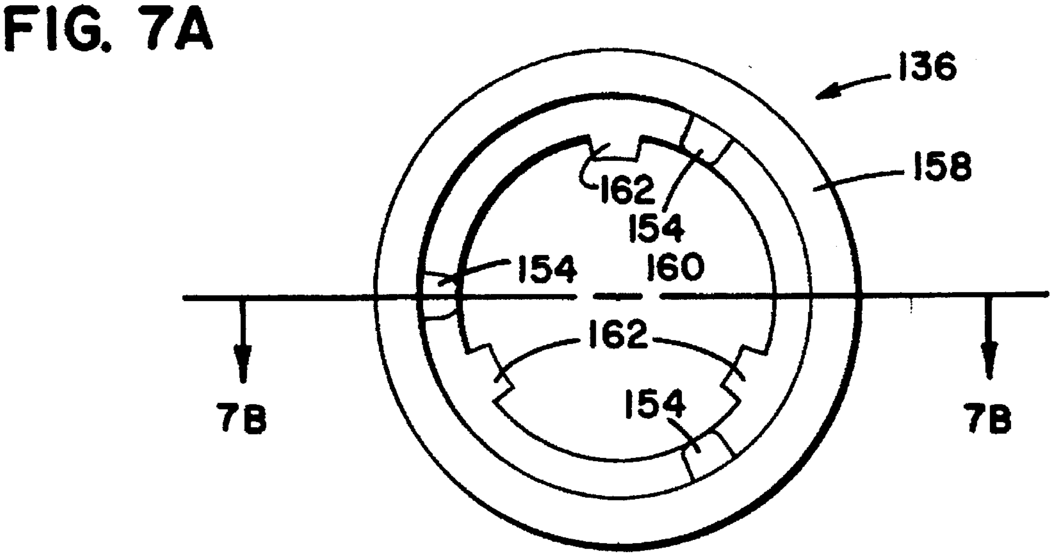
FIG. 7A is a left end view of the locking sleeve collar shown in FIG. 4.
Figure 7B:
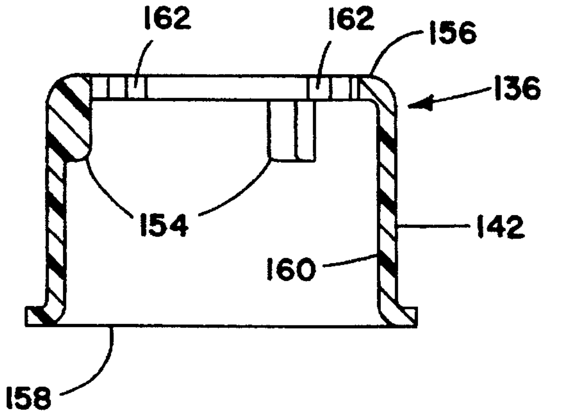
FIG. 7B is a longitudinal cross-sectional view generally along line 7B—7B in FIG. 7A.

Referring now to FIGS. 7A–7B, further details of the locking sleeve collar 136 are shown. In FIG. 7A, a left end view of the locking sleeve collar 136 in FIG. 4 is shown. A plurality of longitudinally extending projections 154 are disposed on an inner surface 160 of the locking sleeve collar 136 proximate a back end 156. A plurality of radially extending projections 162 are disposed proximate the back end 156. A portion of the flexible member 133 is wound around the outer surface 142 of the locking sleeve collar 136 by inserting the end 138 of the flexible member 133 into an aperture on an outer surface 142 of the locking sleeve collar 136. The free end 140 of the flexible member 134 is supported by the coupling locking barrel 116 so that the flexible member 133 biases the locking Sleeve collar 136 along the longitudinal axis A–A'. The flexible member 133 might be a coil spring. In the embodiment shown, the flexible member 133 is out of the fluid passage so as to not come in contact with the fluid. The locking sleeve collar 136 is disposed between the radially extending projections 146 and the back end 124 of the coupling locking barrel 116.

FIG. 7B is a longitudinal cross-section view of the locking sleeve collar 136 generally along line 7B—7B shown in FIG. 7A. The longitudinal projections 154 project from the back end 156 of the locking sleeve collar 136. The radial projections 162 are in the same transverse plane perpendicular to a longitudinal axis of the locking sleeve collar 136 as the back end 156.

Figure 8A:
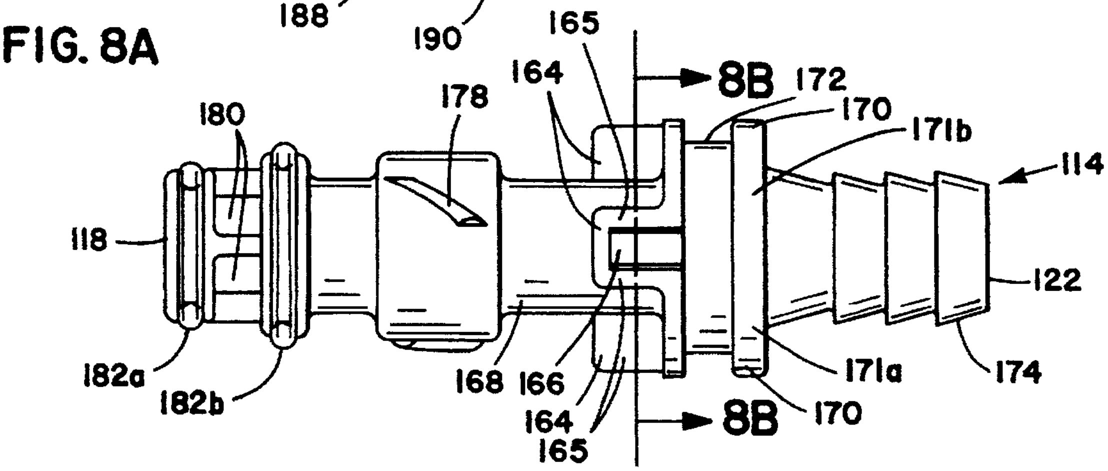
FIG. 8A is a side view of the insert stem shown in FIG. 4.
Figure 8B:
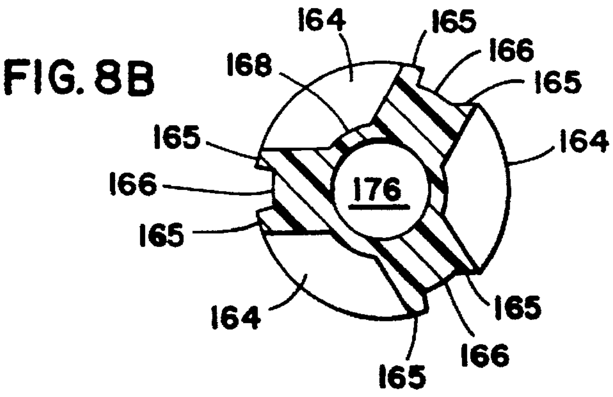
FIG. 8B is a transverse cross-sectional view generally along line 8B—8B in FIG. 8A.

Now referring to FIGS. 8A–8B, different views of the insert stem 114 are shown. In FIG. 8A, a side view of the insert stem 114 is shown. A first circumferential stop flange 164 projecting from an outer surface 168 of the insert stem 114 has longitudinally extending grooves 166 which receive the radially extending projections 162 of the locking sleeve collar 136. The cooperation of the projections 162 and the grooves 166 prevent any relative twisting or rotational movement between the insert stem 114 and the locking sleeve collar 136. Therefore, when the insert stem 114 is turned or rotated, the locking sleeve collar 136 is forced to rotate accordingly. The flange 164 and its grooves 166 and the projections 162 of the locking sleeve collar 136 cooperate with one another to restrain the biased locking sleeve collar 136 against forward longitudinal movement relative to the insert stem 114 beyond a predetermined point while allowing the locking sleeve collar 136 to have backward longitudinal movement relative to the insert stem 114. Proximate the back end of the insert stem 114 is a radially outwardly extending collar portion 170 having three projections 171*a* and three recesses 171*b* which are configured to align with the recesses 145 and projections 143 defined about the opening 144 in the coupling locking barrel 116. When the insert member 114 is mounted in the coupling locking barrel 116, the collar portion 170 provides an interference fit with the opening 144. A recessed collar portion 172 is defined between the stop flange 164 and the collar portion 170 of the insert stem 114. A peripheral edge portion 144*a* of the opening 144 is received in the recessed collar portion 172 (see FIG. 2B). Due to the cooperation between the insert stem 114, the locking sleeve collar and the coupling locking barrel 116 when external rotational or longitudinal forces are applied to the coupling locking barrel 116, the insert stem 114 is forced to move accordingly, as well as the locking sleeve collar 136.

A series of barbs 174 are disposed on the end 122 of the insert stem 114. A cross-sectional view of the insert stem 114 as seen generally along line 8B—8B in FIG. 8A is shown in FIG. 8B. A fluid passage 176 is disposed within the insert stem 114.

Figure 9:
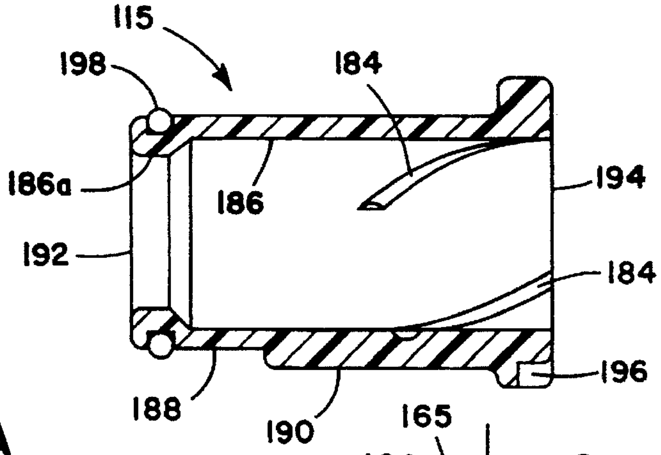
FIG. 9 is a longitudinal cross-sectional view of the hollow sleeve shown in FIG. 4.

Further referring to FIG. 8A, a set of helical splines 178 project from the outer surface 168 of the insert stem 114. In addition, a plurality of fluid passages 180 are disposed at the front end 118 of the insert stem 114 for allowing fluid flow therethrough to/from the passage 176. The end 122 is open to allow fluid flow to/from the passage 176 while the end 118 is closed. Two O-rings 182*a,b* are disposed on each side of the passages 180. When the insert stem 114 is inserted and fully engaged with the hollow sleeve 115, the O-rings 182*a, b* provide a fluid tight seal therebetween. Referring now to FIG. 9, a cross-sectional view of the hollow sleeve 115 of the insert valve assembly 102 is shown. Helical grooves 184 are disposed on an inner surface 186 of the hollow sleeve 115. The helical grooves 184 are configured to receive the corresponding helical splines 178 of the insert stem 114. Accordingly the hollow sleeve 115 can be moved toward or away from the insert stem 114 by simply twisting or rotating the hollow sleeve 115 relative to the insert stem 114. The diameter of an inner surface 186 of the hollow sleeve 115 at a front end 192 is reduced to form a surface 186*a* slightly smaller than the diameter of the outer surface of the O-ring 182*a* of the insert stem 114 at the front end 118. Thus, when the hollow sleeve 115 is fully positioned onto the insert stem 114 by sliding the helical splines 178 fully into the helical grooves 184, the O-ring 182*a* provides a fluid tight seal with the surface 186*a* so that the fluid passage 176 is closed by the O-rings 182*a, b*. When the hollow sleeve 115 is gradually moved longitudinally away from the insert stem 114 by twisting or rotating so as to slide the helical splines 178 along the helical grooves 184, a gap between the O-ring 182*a* and the hollow sleeve 115 near the front end 118 is formed. Thus, the fluid passage 176 is accordingly opened. Therefore, only when the hollow sleeve 115 is rotated so as to move longitudinally of the insert stem 114 is fluid flow from the insert valve assembly 102 to the receptor valve assembly 104 allowed.

Further in FIG. 9, a set of recesses 196 defined on a back end 194 of the hollow sleeve 115 receive the longitudinal projections 154 of the locking sleeve collar 136. When the recesses 196 are engaged with the longitudinal projections 154, no rotational movement of the hollow sleeve 115 is allowed. When the hollow sleeve 115 is fully inserted onto the insert stem 114 which further engages with the locking sleeve collar 136 and the coupling locking barrel 116, no relative rotational movement between the hollow sleeve 115 and the insert stem 114 is allowed because the projections 154 of the locking sleeve collar 136 engage the recesses 196 of the hollow sleeve. Only when the recesses 196 are disengaged from the longitudinal projections 154, is rotational movement of the hollow sleeve relative to the insert stem 114 allowed. This disengagement is made by pushing the locking sleeve collar 136 back toward the end 124 of the coupling locking barrel 116.

Further in FIG. 9, a plurality of longitudinally extending projections 190 project from the outer surface 188 of the hollow sleeve 115. The longitudinal projections 190 extend from the back end 194 along most of the length of the hollow sleeve 115. An O-ring 198 is disposed in a groove at the front end 192.

Figure 10:
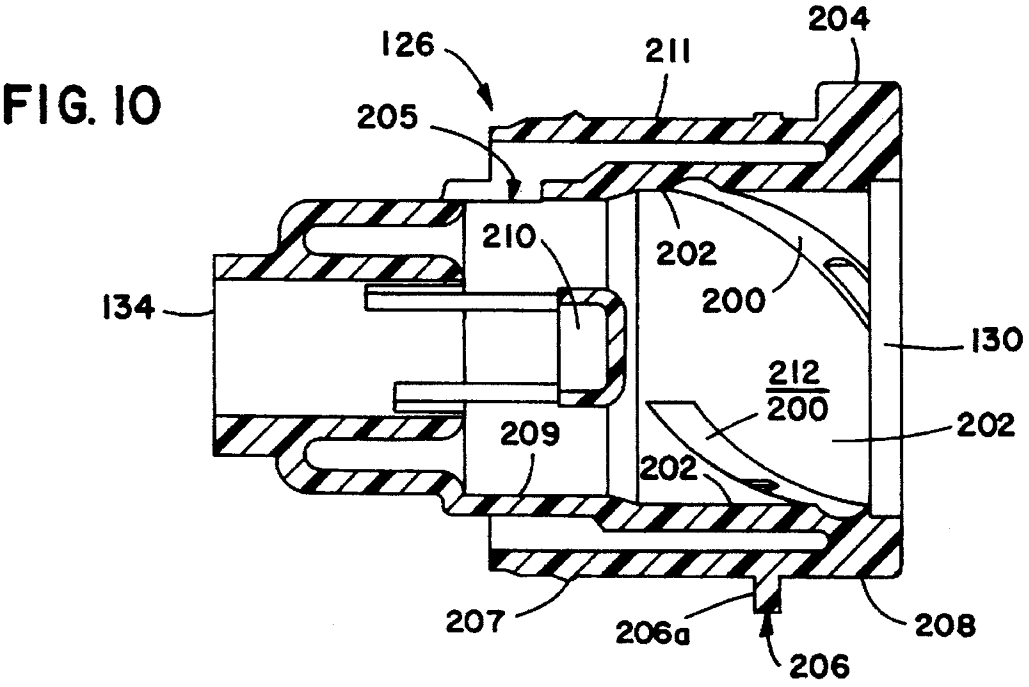
FIG. 10 is a longitudinal cross-sectional view of the fitment body shown in FIG. 5.

Referring now to FIG. 10, there is shown a cross-sectional view of the fitment body 126 of the receptor valve assembly 104. A plurality of helical grooves 200 are disposed in an inner surface 202 near the end 130 of the fitment body 126. A lipseal ball 210 is disposed in a fluid passage 212 defined by the inner surface 202 of the fitment body 126. The lipseal ball 210 forms a seal with the circumferential seal 220*b* which is flexible so as to allow the venting of fluid in the direction of the container should excess pressure develop in the fluid passage outside the container. However, the sealing effect will be increased if pressure develops on the container side of the lipseal ball 210. Accordingly, the lipseal ball 210 and seal 220*b* arrangement will allow one way venting of fluid into the container should excessive fluid pressure build up when the insert valve assembly 102 is being coupled to the receptor valve assembly 104.

A circumferential stop flange 206 is disposed at the end 130 of the fitment body 126. The stop flange 206 prevents insertion of the insert valve assembly 102 into the receptor valve assembly 104 beyond a predetermined point. In the preferred embodiment shown, the stop flange 206 includes three separate flange members 206*a* separated by from one another by gaps or openings 206*b*.

In addition, a plurality of L-shape projections 204 extend radially outward from the end 130 of the fitment body 126. Recesses 208 defined between the ends of the L-shape projections 204 receive the radially extending coupling teeth 146 of the coupling locking barrel 116. When the recesses 208 receive the radially extending coupling teeth 146, the locking sleeve collar 136 is pushed toward the back end 124 of the coupling locking barrel 116 by the L-shape projections 204 engaging the locking sleeve collar 136 so as to disengage the longitudinal projections 154 of the locking sleeve collar 136 from the recesses 196 of the hollow sleeve 115. Grooves 214, which are defined between the stop flange 206 and the L-shape projections 204, receive the radially extending coupling teeth 146 when the coupling locking barrel 116 is rotated to move the radially extending coupling teeth 146 into the grooves 214 between the stop flanges 206 and the L-shaped projections 204. The fitment body 126 might include a graduated scale to indicate how far the dispensing valve is opened as the coupling locking barrel 116 is rotated and the coupling teeth 146 slide in the grooves 214.

Additionally, the fitment body 126 is shown as having an outer double wall structure with an inner wall 209 and an outer wall 211. When used with a container the outer wall 211 forms an interference fit with the opening of the container. The outer wall 211 is shown as having an inclined protrusion 207 which provides a snap fit with the opening of the container. Upon insertion of the fitment body 126 into the container, the fitment body will snap into place so as to provide a secure attachment to the container. Typically, the opening of the container will be reinforced with a suitable liner or fitment.

Figure 11A:
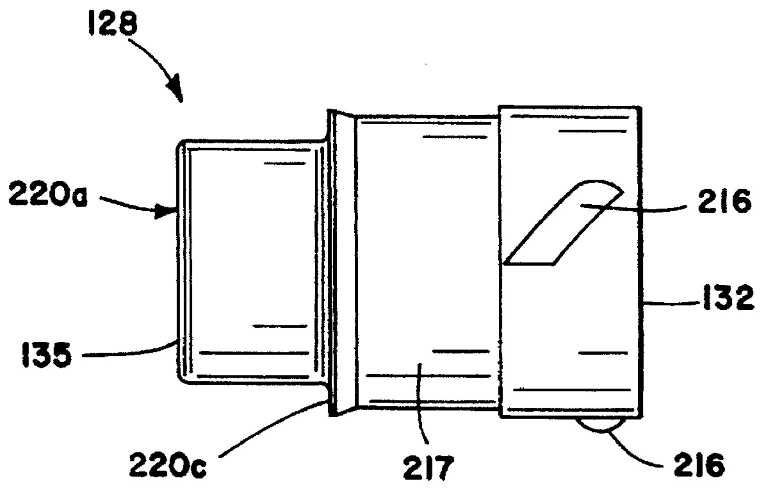
FIG. 11A is a side view of the hollow insert shown in FIG. 5.
Figure 11B:
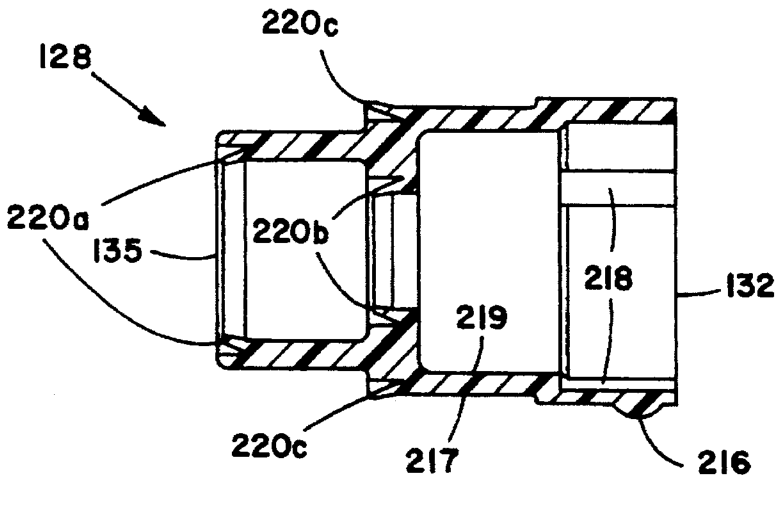
FIG. 11B is a longitudinal cross-sectional view of the bottom insert shown in FIG. 11A.

Now referring to FIGS. 11A–11B, different views of the hollow insert 128 are shown. In FIG. 11A, a side view of the hollow insert 128 of the receptor valve assembly 104 is shown. A plurality of helical splines 216 disposed on an outer surface 217 are configured to cooperate with the helical grooves 200 of the fitment body 126. Accordingly, as the hollow insert 128 is twisted or rotated relative to the fitment body 126, the hollow insert 128 is caused to move longitudinally in the fitment body 126. In addition, a plurality of molded integral seals 220 are disposed on the outside surface 217 near the end 132 to provide fluid tight seals.

In FIG. 11B, there is shown a cross-sectional view of the hollow insert 128 of the receptor valve assembly 104. A plurality of longitudinal grooves 218 are disposed in an inner surface 219 of the hollow insert 128. The longitudinal projections 190 of the hollow sleeve 115 are configured to be received by the longitudinal grooves 218 when the hollow sleeve 115 is inserted into the hollow insert 128. This cooperation prevents any relative rotation between the hollow sleeve 115 and the hollow insert 128 and limits how far the hollow sleeve 115 can be inserted into the hollow insert 128. Thus, when the hollow sleeve 115 is twisted or rotated, the hollow insert 128 is forced to twist or rotate and thus move longitudinally relative to the fitment body 126. The longitudinal projections 190 are setback from the front end of the hollow sleeve 115 so that they do not engage the longitudinal grooves 218 of the hollow insert until the insert valve assembly 102 has been fully inserted into the receptor valve assembly 104.

Figure 12:
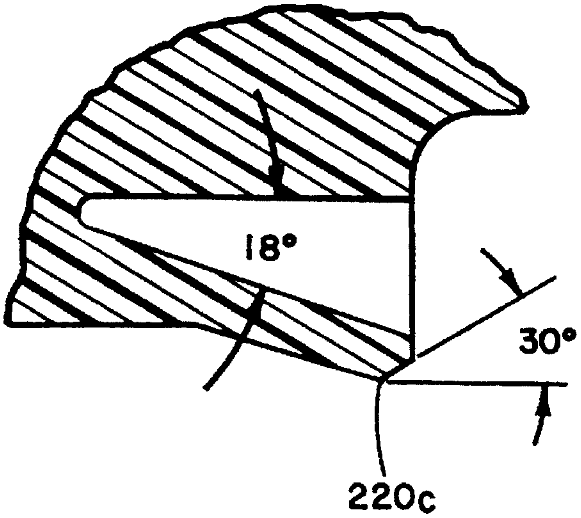
FIG. 12 is an enlarged longitudinal cross-section view of the molded integral seal of the hollow insert shown in FIG. 11B.

The molded integral seals 220 are used to flexibly engage the hollow insert 128 to the fitment body 126. There are three such circumferentially extending seals 220*a,b,c*. These seals 220 are preferably part line free. Alternatively, O-rings may be used instead of the molded integral seals. Referring to FIG. 12, an enlarged view of one of the molded integral seals 220 of the hollow insert 128 is shown. Various angles of the molded integral seal 220 can be used. In the preferred embodiment, the angle shown in the molded integral seal 220 is about 30 degrees.

Figure 13:
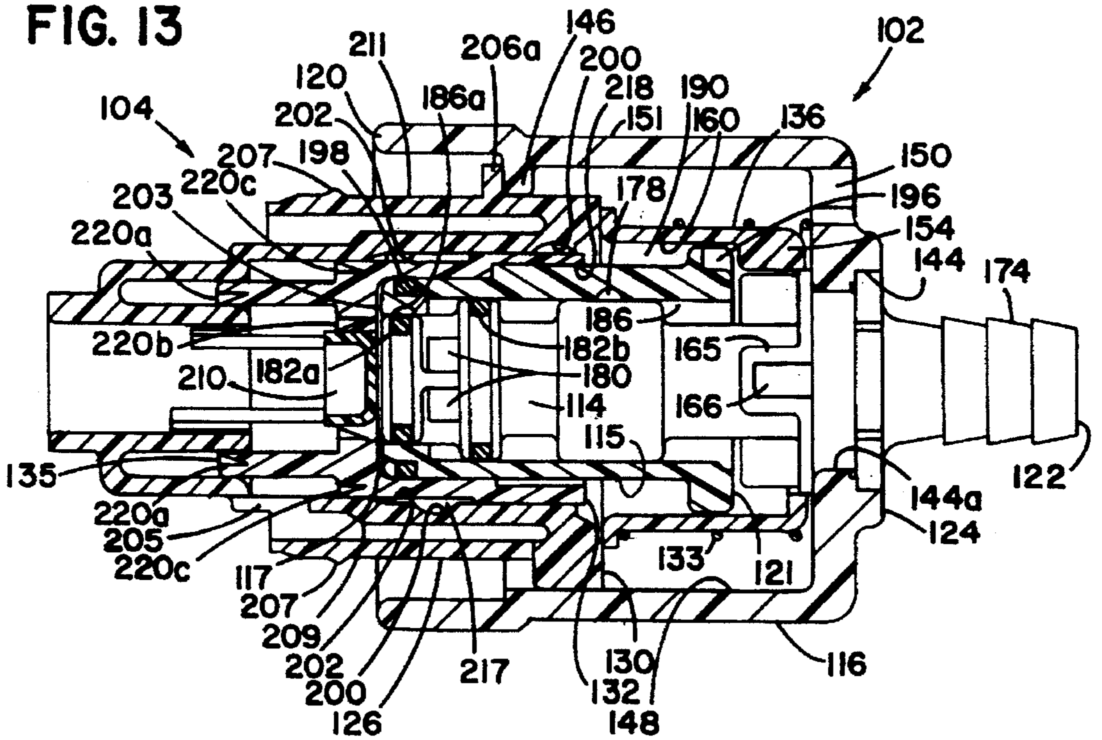
FIG. 13 is a longitudinal cross-sectional view of the dispensing valve in a closed position.

Use of the dispensing valve 100 will now be described. Referring to FIG. 13, there is shown a cross-sectional view of the dispensing valve 100 in a closed position. The insert valve assembly 102 and the receptor Valve assembly 104 are coupled to each other as shown by simply pushing them into contact with each other. The insert stem 114 is fixedly positioned in the opening 144 at the back end 124 of the coupling locking barrel 116. The insert stem 114 is also engaged with the locking sleeve collar 136. The coil spring 133 disposed between the back end 124 of the coupling locking barrel 124 and the locking sleeve collar 136 has been compressed. The hollow sleeve 115 is engaged with the insert stem 114 with the helical splines 178 of the insert stem 115 being disposed in the helical grooves 184 of the hollow sleeve 115. The locking sleeve collar 136 has been pushed back by the front end 130 of the fitment body 126 so the hollow sleeve 115 is no longer engaged by the longitudinal projections 154 of the locking sleeve collar 136 projecting into the recesses 196 of the hollow sleeve 115. The fluid passage 176 in the insert valve assembly 102 is closed.

At this time, the circumferential seal 220*b* of the hollow insert 128 of the receptor valve assembly 104 forms a fluid tight seal with the lipseal ball 210 so that the fluid passage 212 of the receptor valve assembly 104 is closed. Therefore, no fluid is allowed to flow from the receptor valve assembly 104 to the insert valve assembly 102.

The hollow sleeve 115 is aligned with the hollow insert 128, and the insert valve assembly 102 is aligned to the receptor valve assembly 104 by inserting the radial projections 146 of the coupling locking barrel 116 into the recesses 208 defined between the L-shaped projections 204 of the fitment body 126. At this time, the valve passages 212 and 176 are still closed. However, the locking sleeve collar 136 is pushed back by the front end 130 of the fitment body 126 to disengage the hollow sleeve 115 from the locking sleeve collar 136 so as to allow the relative twisting movement between the hollow sleeve 115 and the insert stem 114 of the insert valve assembly 102.

It will be appreciated from this discussion that the embodiment disclosed will not allow the dispensing valve 100 to be opened until the insert valve assembly 102 and the receptor valve assembly 104 are securely attached to each other. Moreover, they cannot be disconnected without the fluid passageway therethrough being sealed. In the embodiment shown, the hollow sleeve 115 remains locked until the insert valve assembly 102 and the receptor valve assembly 104 are fully engaged. As soon as the coupling locking barrel 116 is rotated to open the dispensing valve, the projections 146 of the locking barrel are captured in the grooves 214 of the fitment body.

Figure 14:
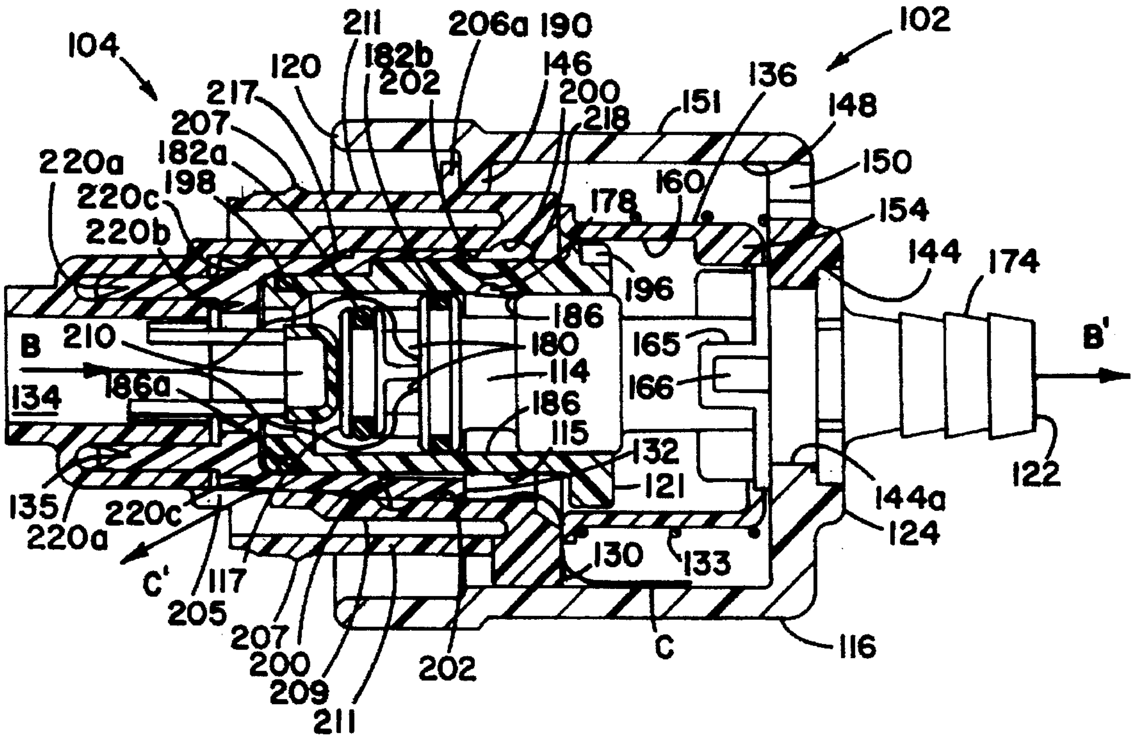
FIG. 14 is a longitudinal cross-sectional view of the dispensing valve in an opened position.

Now referring to FIG. 14, there is shown a cross-sectional view of the dispensing valve 100 in an opened position. When an external twisting or rotating force is applied to the coupling locking barrel 116, the radially extending coupling teeth 146 are forced to slide into the grooves 214. At this time, the hollow sleeve 115 is forced to longitudinally move toward the receptor valve assembly 104 by sliding the helical splines 178 along the helical grooves 184. Accordingly, the fluid passage 176 in the insert valve assembly 102 is opened. Since no relative movement is allowed between the hollow insert 128 and the hollow sleeve 115, the hollow insert 128 is likewise caused to move longitudinally relative to the lipseal ball 210 so that the fluid passage 212 in the receptor valve assembly 204 is opened. Therefore, fluid is allowed to flow from the receptor valve assembly 104 to the insert valve assembly 102.

In the preferred embodiment, it is intended that the receptor valve assembly 104 will be disposed of with the container while the insert valve assembly will be reused. Of course, both components might be reused, disposed of, etc.

Arrow B–B' in FIG. 14 represents fluid flow through the dispensing valve 100. As illustrated in FIG. 14 by the arrow C—C', an air passage is also provided by the dispensing valve 100 for venting air while fluid is being dispensed. The preferred embodiment shown allows simultaneous venting of air into a container as liquid is being dispensed from the container. The air passage is closed when the dispensing valve 100 is closed. As illustrated, the fitment body 126 includes an opening 205 in the inner wall 209 of the fitment body 126. Circumferential, integral seal 220*c* on the hollow insert 128 forms an air tight seal with the inner surface 202 of the inner wall 209 of the fitment body 126 when the dispensing valve 100 is closed. However, when the dispensing valve 100 is opened, the seal 220*c* is disposed adjacent the opening 205 in the inner wall 209 so as to no longer form an air tight seal with the inner wall 209. Accordingly air is allowed to enter through the openings 150 in the back end of the locking coupling barrel 116, flow between the inner wall 209 of the fitment body 126 and the hollow insert 128 and then flow out the vent opening 205 into the container. There is an air space defined between the hollow insert 128 and the fitment body 126 due to the cooperation of their helical splines 216 and helical grooves 200 which cooperate to support the hollow insert 128 in the fitment body 126.

When the dispensing valve 113 of the preferred embodiment is closed, there substantially no fluid cavity remaining between the insert valve assembly 102 and the receptor valve assembly 104. Accordingly, there is substantially no spillage of fluid when the insert valve assembly 102 is disconnected from the receptor valve assembly 104. This is best illustrated in FIG. 13, where a small fluid cavity 203 is shown between the ends of the insert valve assembly 102 and the receptor valve assembly 104. It will be appreciated that in the preferred embodiment, there is substantially no cavity 203 present.

In the embodiment shown, the fitment body and hollow insert a right hand helix while the insert stem 114 and the hollow sleeve 115 have a left hand helix. It will be appreciated that other combinations of helixes might be used.

Manufacture of the embodiment shown is accomplished using conventional molding techniques. The various components of the preferred embodiment are preferably molded of a suitable material such as plastic using conventional molding techniques. The parts with the partline free integral seals, such as the seals 220 on the hollow insert 128, might be formed by using cylindrical mold elements. For example, the hollow insert 128 which has three such seals 120*a,b,c*; might be formed using two or more cylindrical molds elements. One of the cylindrical mold elements might be used to form a first end portion of the hollow insert 128 and a second is used to form a second end portion. After the plastic material hardens, the mold element(s) forming an undercut at the seals 120 is removed. The other mold element is then stripped off. The seals 120 are forced into the undercut as the mold element is stripped off.

In the embodiment shown, the receptor valve assembly 104 is made of two integrally molded parts, the fitment body 126 and the hollow insert 128. The insert valve assembly 102 includes four integrally molded parts; the coupling locking barrel 116, the locking sleeve collar 136, the insert stem 114, and the hollow sleeve 115.

In one method of assembling the valve, the flexible member 133 is disposed about the locking sleeve collar 136 and the locking sleeve collar is then positioned in the coupling locking barrel 116. The O-rings are place on the insert stem 114 and the insert stem 114 is positioned in the coupling locking barrel opening 144 by inserting the insert stem 114 from the front side of the locking barrel 116. The hollow sleeve 115 is inserted onto the insert member 114. The receptor valve assembly 104 is assembled by inserting the hollow insert 128 into the fitment body 126.

FIGS. 15–19 illustrates a second embodiment of the insert assembly 102'. The second embodiment of the insert assembly 102' connects/disconnects to/from the receptor valve assembly 104 as shown in FIG. 3B so as to form a second embodiment of the dispensing valve 100'.

Figure 15:
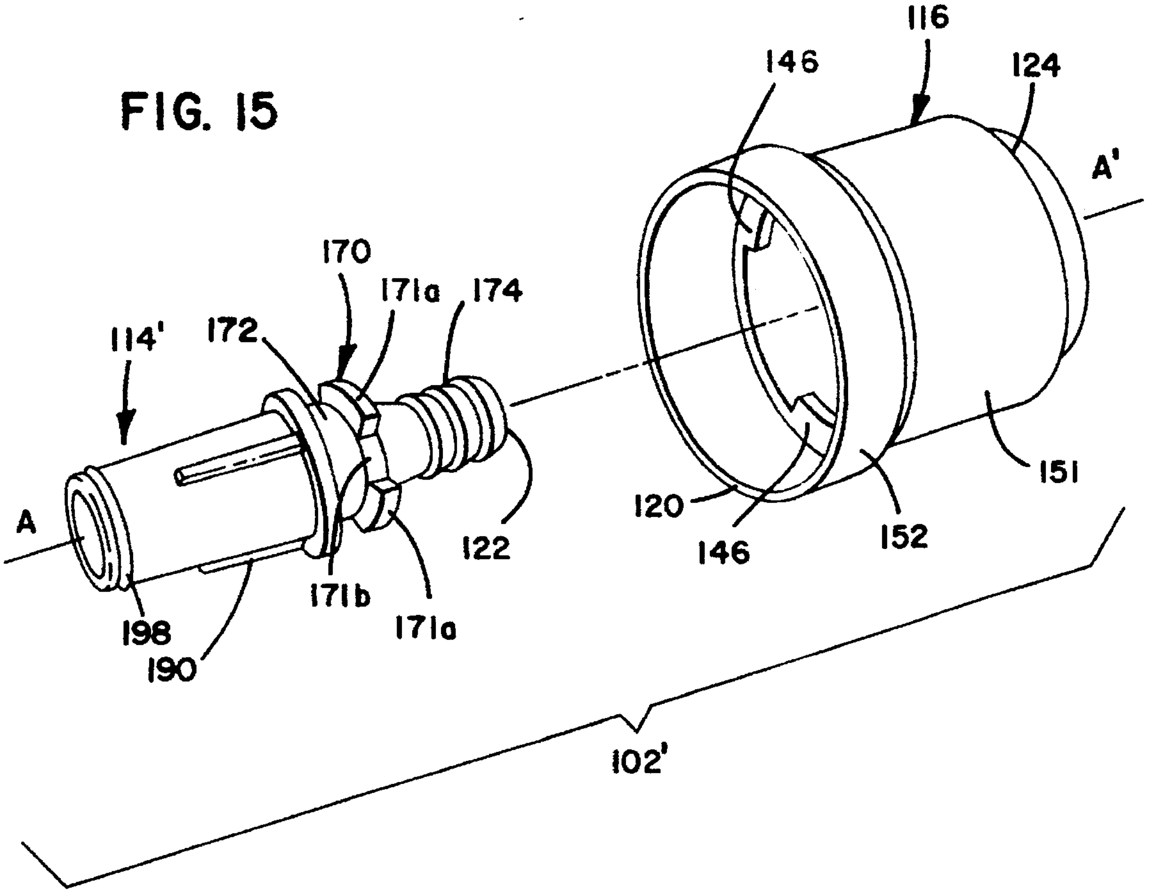
FIG. 15 is an exploded view of a second embodiment of the insert valve assembly or the so-called insert assembly.
Figure 16:
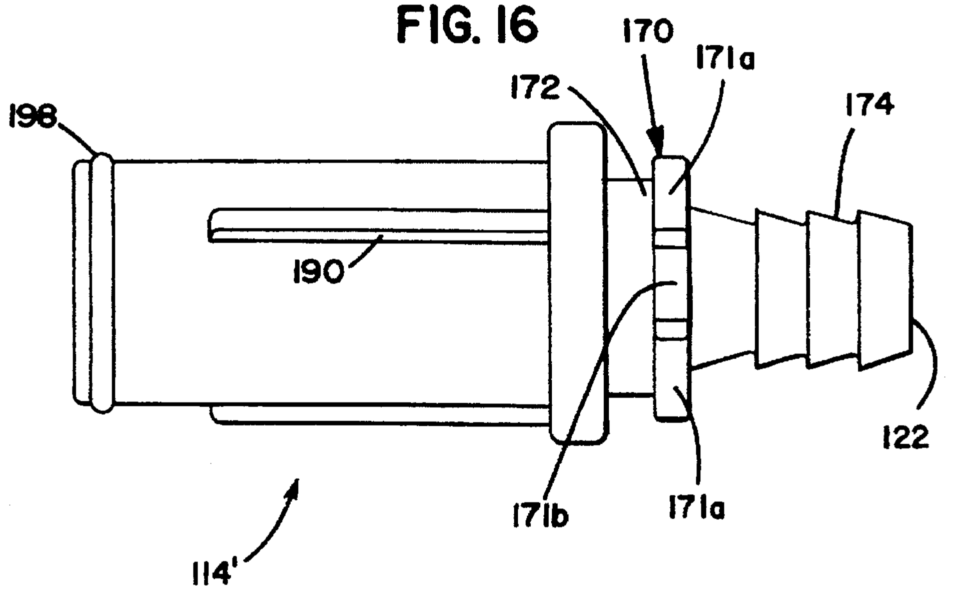
FIG. 16 is a side view of a hollow insert stem, which is a second embodiment of the insert stem of the of the insert assembly.
Figure 17:
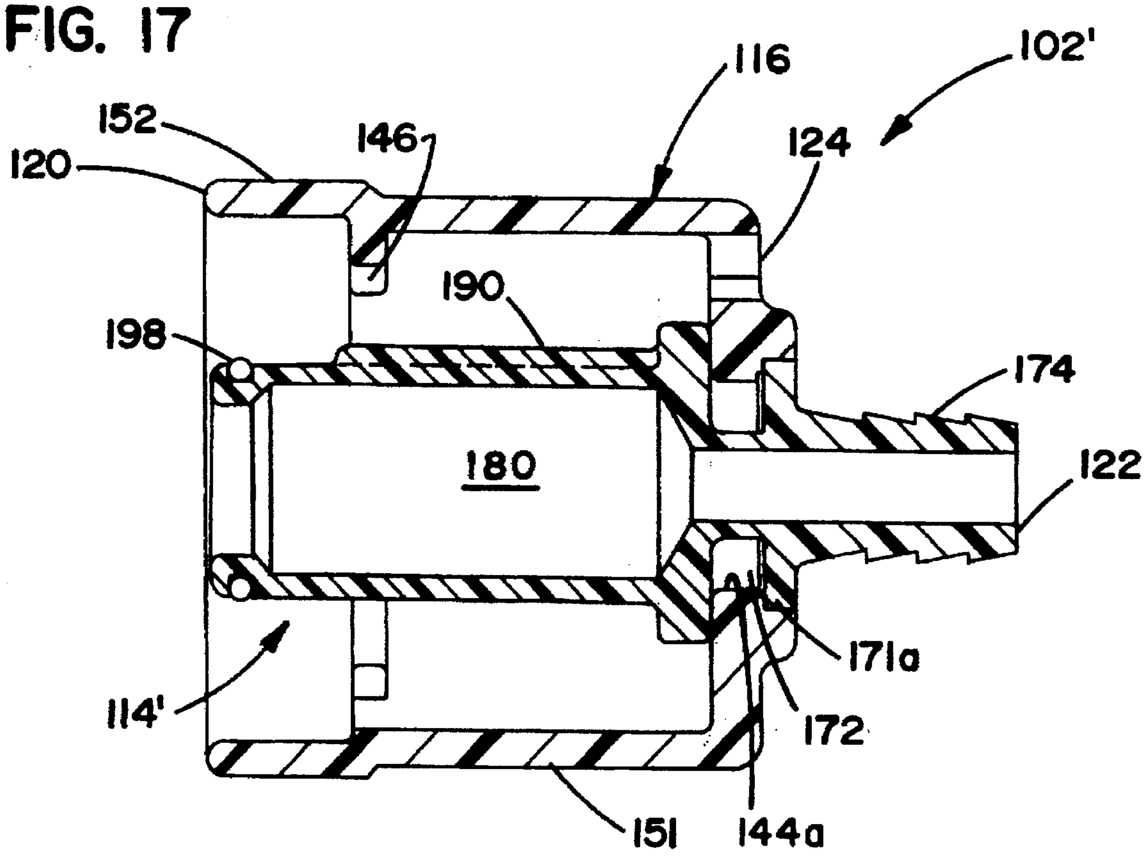
FIG. 17 is a longitudinal cross-sectional view of the insert assembly shown in FIG. 16.

In FIGS. 15–17, a second embodiment of the insert valve in the insert assembly 102', a fluid passage 180' is shown, hereinafter called insert assembly 102'. The fluid passage 180 of the insert assembly 102' remains open, so that there is no valve function in the insert assembly 102'. For the purposes of illustration, some of the reference numerals in the second embodiment which illustrate the same parts as those in the first embodiment are still the same as illustrated in the first embodiment. In the second embodiment, the back end 121 of the hollow sleeve 115 is molded with the outer surface 168 of the insert stem 114 into one piece, which constitutes a hollow insert stem 114' as shown. The front parts of the insert stem 114 of the first embodiment, from the front end 118 up to the recessed collar portion 172 (not including the recessed collar portion 172), are eliminated. In addition, the flexible member 133 and the locking sleeve collar 136 are also eliminated.

As shown in FIG. 17, the coupling locking barrel 116 is attached to the hollow insert stem 114' in the same manner as described in the first embodiment. The peripheral edge portion **144*a* is received in the recessed collar portion 172 of the hollow insert stem 114'. Accordingly, the hollow insert stem 114' of the second embodiment replaces for the insert sleeve 115, the insert stem 114, the locking sleeve collar 136, and the flexible member 133 of the first embodiment. In addition, the fluid passage 180 is defined in the hollow insert stem 114'. There is no valved configuration in the insert assembly 102', and only the receptor valve assembly 104 has a valved configuration for controlling a fluid flow in the dispensing valve 100. The insert assembly 102' is much cheaper than the insert valve assembly 102 because less parts are used in the insert assembly 102'. Further, the insert assembly 102'** is readily used with a fluid line where spillage is not a concern.

Figure 18:
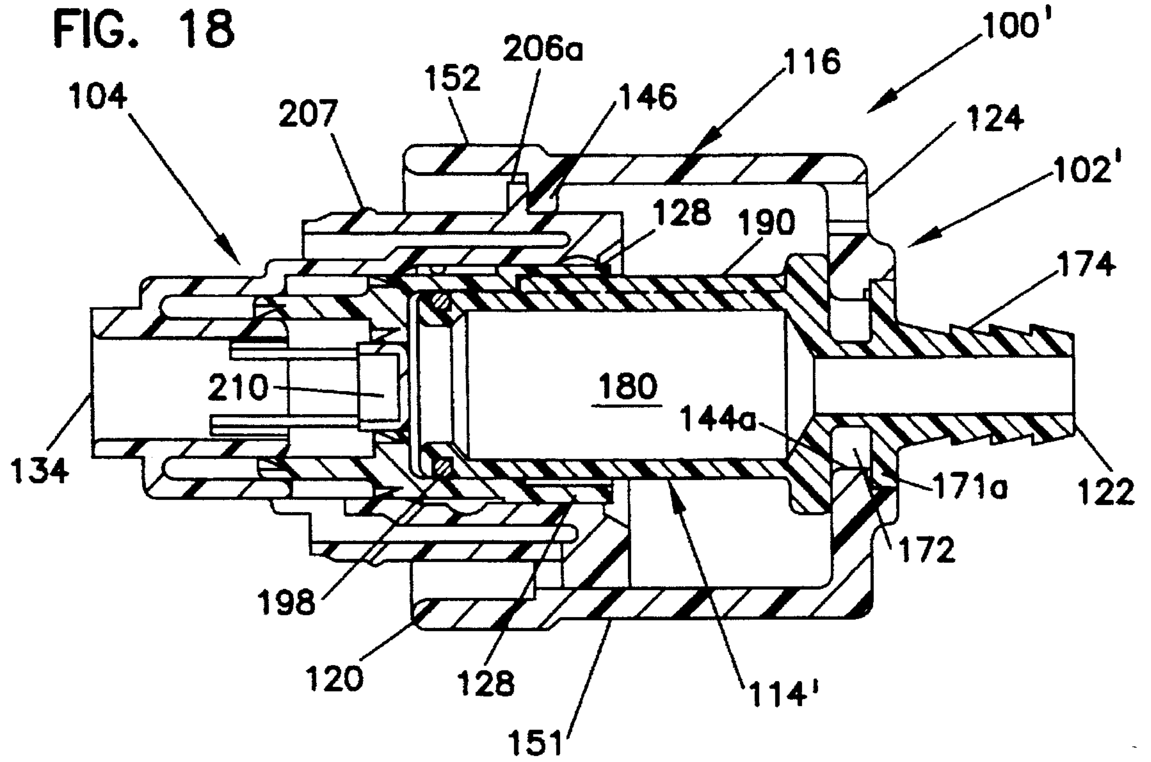
FIG. 18 is a longitudinal cross-sectional view of a second embodiment of the dispensing valve in a closed position, including the second embodiment of the insert assembly which connects with the first embodiment of the receptor valve assembly as shown in FIG. 3B.
Figure 19:
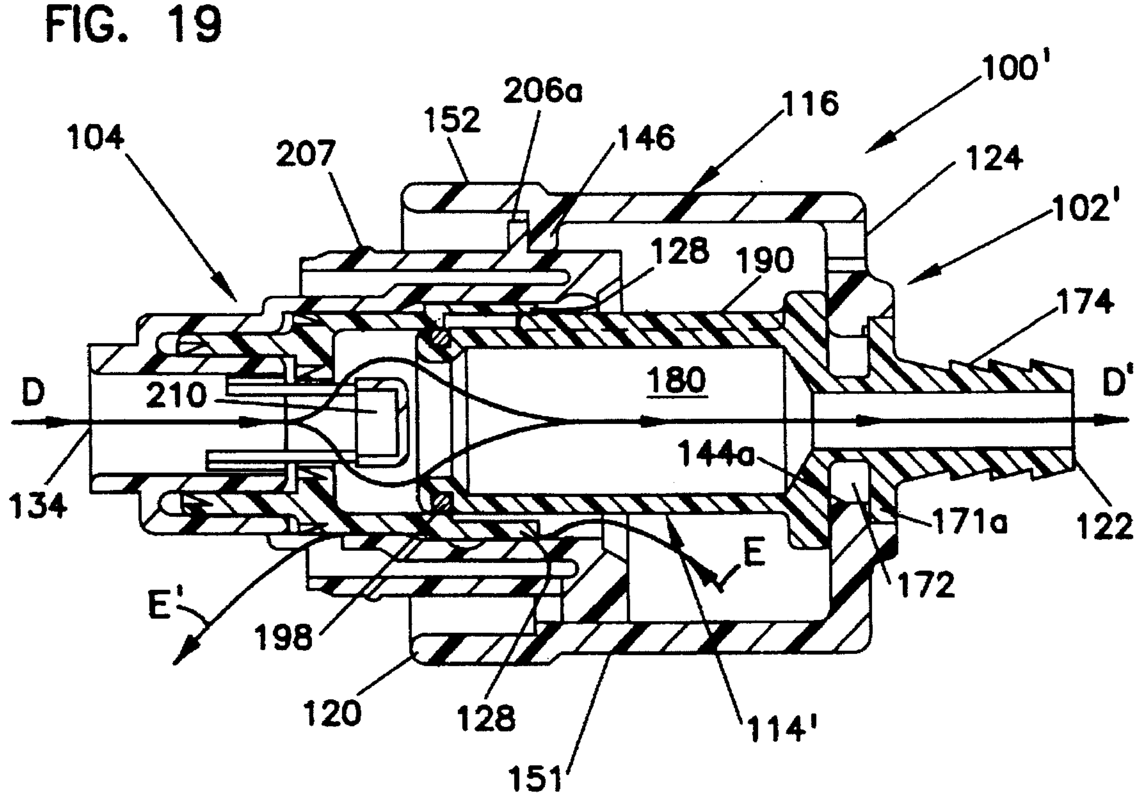
FIG. 19 is a longitudinal cross-sectional view of the second embodiment of the dispensing valve in an opened position including the second embodiment of the insert assembly which connects with the first embodiment of the receptor valve assembly as shown in FIG. 3B.

In operation, after the insert assembly 102' and the receptor valve assembly 104 are locked to each other as described in the first embodiment and as also shown in FIGS. 18–19, the insert assembly 102' is rotated, and this rotation actuates the rotation of the hollow insert stem 114' and the hollow insert 128 because of the engagement between the longitudinally extending projections 190 and the longitudinal grooves 218 (see FIG. 11B), and also simultaneously actuates the movement of the hollow insert 128 toward the back end of the receptor valve assembly 104 because of the engagement between the helical splines 216, (see FIG. 11B) and the helical grooves 200 (see FIG. 10). Therefore, the fluid passage closed by the receptor valve assembly 104 is opened. To close the fluid passage in the receptor valve assembly 104, the insert assembly 102' is counter-rotated so as to move the hollow insert 128 toward the back end of the insert assembly 102' . Similar to arrow B–B' as shown in FIG. 14, arrow D-D' in FIG. 19 represents fluid flow through the dispensing valve 100'. The arrow E-E' which represents an air passage, similar to the air passage C–C' as shown in FIGS. 14, is also provided by the dispensing valve 100' for venting air while fluid is being dispensed.

It is appreciated that the dispensing valve 100 can also be made such that only the insert valve assembly 102 has a valved configuration, and the receptor valve assembly 104 does not have a valved configuration.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended figs are expressed.

What is claimed is:

1. A valve assembly, comprising:

a receptor valve assembly having a fluid passage therethrough and including a fitment body and a hollow insert disposed in the fitment body, the fitment body including a first end portion and a second end portion and defining a fluid passage therethrough, the fitment body further having an inner surface with a set of helical grooves disposed therein, the hollow insert including first and second end portions and an outer surface having a set of helical splines on an outer surface corresponding to the first set of the helical grooves of the fitment body, the hollow insert further having an inner surface defining a set of longitudinal apertures proximate the second end portion of the hollow insert, the fitment body and the hollow insert cooperating together to normally close the fluid passage; and an insert assembly defining a fluid passage therethrough and including a coupling locking barrel and a hollow insert stem, the hollow insert stem being attached to the coupling locking barrel to prevent relative movement therebetween, an outer surface of the hollow insert stem having a set of longitudinal projections receivable in the corresponding longitudinal apertures of the hollow insert of the receptor valve assembly, upon rotation of the insert assembly relative to the receptor valve assembly, the normally closed fluid passage of the receptor valve assembly being opened and interconnected with the fluid passage of the insert assembly.

2. A valve assembly as claimed in claim 1, wherein the fluid passage of the insert assembly remains open.

3. A valve assembly as claimed in claim 1, wherein the hollow insert of the receptor valve assembly includes integrally molded seals.

4. A valve assembly as claimed in claim 1, wherein the fitment body includes a double wall structure including an outer and an inner wall.

5. A valve assembly as claimed in claim 1, wherein an air passage separate and distinct from the fluid passages is provided through the valve assembly when the valve assembly is opened, the air passage being closed when the valve assembly is closed.

6. A valve assembly as claimed in claim 1, wherein a seal member is provided in the receptor valve assembly for allowing one way fluid flow upon occurrence of excessive fluid pressure in the valve assembly.

7. A valve assembly, comprising:

a receptor valve assembly defining a normally closed fluid passage;

an insert assembly defining a fluid passage;

the insert assembly including an insert member, the receptor valve assembly including a receptor valve member, the insert member being receivable in the receptor valve member for connecting the insert assembly and the receptor valve assembly and being operable upon rotation of the insert assembly relative to the receptor valve assembly for opening the fluid passage of the receptor valve assembly; and the receptor valve assembly and the insert assembly cooperating to define air passage means for venting air while allowing fluid flow.

8. A valve assembly, comprising:

a receptor valve assembly defining a normally closed fluid passage;

an insert assembly defining a fluid passage;

the insert assembly including an insert member, the receptor valve assembly including a receptor valve member, the insert member being receivable in the receptor valve member for connecting the insert assembly and the receptor valve assembly and being operable upon rotation of the insert assembly relative to the receptor valve assembly for opening the fluid passage of the receptor valve assembly; and the receptor valve assembly and the insert assembly including means for locking the receptor valve assembly and insert assembly together when the valve assembly is opened.

* * * * *